(12) United States Patent
Yuan et al.

(10) Patent No.: US 12,002,281 B2
(45) Date of Patent: Jun. 4, 2024

(54) METHOD AND APPARATUS FOR FINGERPRINT IDENTIFICATION, AND ELECTRONIC DEVICE

(71) Applicant: SHENZHEN GOODIX TECHNOLOGY CO., LTD., Guangdong (CN)

(72) Inventors: Chao Yuan, Guangdong (CN); Xiaogang Qing, Guangdong (CN); Jiemin Zeng, Guangdong (CN)

(73) Assignee: SHENZHEN GOODIX TECHNOLOGY CO., LTD., Guangdong (CN)

(*) Notice: Subject to any disclaimer, the term of this patent is extended or adjusted under 35 U.S.C. 154(b) by 138 days.

(21) Appl. No.: 17/838,845

(22) Filed: Jun. 13, 2022

(65) Prior Publication Data
US 2023/0215209 A1    Jul. 6, 2023

(30) Foreign Application Priority Data

Dec. 31, 2021    (CN) .......................... 202111669425.8

(51) Int. Cl.
*G06V 40/13* (2022.01)
*G06V 10/98* (2022.01)
*G06V 40/12* (2022.01)

(52) U.S. Cl.
CPC ............ *G06V 40/13* (2022.01); *G06V 10/993* (2022.01); *G06V 40/1365* (2022.01)

(58) Field of Classification Search
CPC .. G06V 40/13; G06V 10/993; G06V 40/1365; G06V 40/12
See application file for complete search history.

(56) References Cited

U.S. PATENT DOCUMENTS

| 2014/0267659 | A1* | 9/2014 | Lyon ....................... G06V 10/98 348/77 |
| 2017/0344795 | A1 | 11/2017 | Zhou |
| 2018/0268198 | A1 | 9/2018 | Zhou |
| 2018/0288301 | A1* | 10/2018 | Fu .......................... H04N 23/73 |
| 2019/0197287 | A1* | 6/2019 | Han ...................... G06F 3/0412 |
| 2020/0005018 | A1* | 1/2020 | Lo .......................... G06V 40/13 |
| 2020/0111825 | A1* | 4/2020 | Yin ...................... G06F 13/4282 |

(Continued)

FOREIGN PATENT DOCUMENTS

EP    3252661 A1    12/2017

*Primary Examiner* — Jonathan A Boyd
(74) *Attorney, Agent, or Firm* — Scully, Scott, Murphy & Presser, P.C.

(57) ABSTRACT

Embodiments of the present application provide a method for fingerprint identification, and electronic device. The method includes: acquiring a first image collected by a fingerprint sensor at a first exposure time; determining whether to acquire a second image collected by the fingerprint sensor at a second exposure time according to the first image, where the second exposure time is continuous with the first exposure time, and a length of the second exposure time is greater than or equal to a length of the first exposure time; performing fingerprint identification according to the first image, or, the first image and the second image. The method, and electronic device of the embodiments of the present application can take into account an unlocking rate and unlocking time, thereby improving unlocking experience of a user.

16 Claims, 4 Drawing Sheets

(56) References Cited

U.S. PATENT DOCUMENTS

| | | | |
|---|---|---|---|
| 2020/0175248 A1* | 6/2020 | Wu | G06V 10/141 |
| 2020/0193129 A1* | 6/2020 | Chen | G06V 40/1318 |
| 2021/0303815 A1* | 9/2021 | Chung | G06V 40/1306 |
| 2021/0326561 A1 | 10/2021 | Qiu | |

* cited by examiner

METHOD AND APPARATUS FOR FINGERPRINT IDENTIFICATION, AND ELECTRONIC DEVICE

CROSS-REFERENCE TO RELATED APPLICATION

This application claims priority to Chinese Patent Application No. 202111669425.8, filed on Dec. 31, 2021, which is hereby incorporated by reference in its entirety.

TECHNICAL FIELD

Embodiments of the present application relates to the field of fingerprint identification, and more specifically, to a method and apparatus for fingerprint identification, and electronic device.

BACKGROUND

At present, fingerprint identification products are more and more favorable for people. Users have been paying more attention to the speed of fingerprint unlocking rate, and the users all hope to unlock as "fast" as possible. The shorter the unlocking time, the better the user experience.

Exposure duration of current fingerprint sensors is a fixed value, and in order to take into account the unlocking rate of the worst-quality finger, the fingerprint sensor is usually set with a long exposure duration, which leads to a longer unlocking time and affects the user's unlocking experience.

SUMMARY

Embodiments of the present application provide a method and apparatus for fingerprint identification, and electronic device, which can take into account an unlocking rate and unlocking time, thereby improving unlocking experience of a user.

In a first aspect, a method for fingerprint identification is provided, the method includes: acquiring a first image collected by a fingerprint sensor at a first exposure time; determining whether to acquire a second image collected by the fingerprint sensor at a second exposure time according to the first image, where the second exposure time is continuous with the first exposure time, and a length of the second exposure time is greater than or equal to a length of the first exposure time; performing fingerprint identification according to the first image in a case that it is determined not to acquire the second image; or performing fingerprint identification according to the first image and the second image in a case that it is determined to acquire the second image.

In this embodiment, the fingerprint sensor is configured for continuous exposure, and the processor may first determine, based on the first image collected at the first exposure time, whether to obtain the second image collected at the second exposure time. If it is determined not to acquire the second image collected at the second exposure time, fingerprint identification is performed directly based on the first image. If it is determined to acquire the second image collected at the second exposure time, identification is performed based on the first image and the second image. Since the fingerprint sensor supports continuous exposure, while the fingerprint sensor is collecting the second image, the processor is also acquiring and processing the first image. Compared with the technical solution that the fingerprint sensor acquires the second image in the case that the identification is unsuccessful based on the first image, this embodiment can reduce the unlocking time, thereby improving the user's unlocking experience.

In addition, the length of the second exposure time is configured to be greater than the length of the first exposure time. In the case of fingerprint identification performed based on the first image, the unlocking time can be greatly reduced due to the short first exposure duration. And in the case of fingerprint identification performed based on the first image and the second image, since the fingerprint sensor is exposed continuously, that is, when the fingerprint sensor collects the second image, the processor also acquires and processes the first image, which can also reduce the unlocking time. Therefore, it is beneficial to reduce the unlocking time while taking into account the unlocking rate, so that the unlocking experience of the user can be improved.

In a possible implementation manner, where an ending moment of the second exposure time is not early than a moment when the second image is acquired.

In this embodiment, the occurrence of CRC errors can be avoided in the case of using a lower-cost fingerprint sensor.

In a possible implementation manner, where the determining whether to acquire a second image collected by the fingerprint sensor at a second exposure time according to the first image includes: preprocessing the first image to acquire a value of a corresponding fingerprint parameter, where the fingerprint parameter includes any one of a fingerprint signal, a fingerprint image quality score, and pixel data of the fingerprint sensor when collecting an image; and determining to acquire the second image in a case that it is determined that the value of the fingerprint parameter is less than a first threshold.

In this embodiment, preprocessing the first image is beneficial to the accuracy of fingerprint feature extraction. In addition, by comparing the value of the fingerprint parameter corresponding to the first image with the preset first threshold, the quality of the first image can be judged, that is to say, it can be judged whether the finger texture of the user currently pressed is clear. In the case that the quality of the first image is judged to be good, fingerprint identification can be performed directly based on the first image. Compared to the technical solutions of the prior art that a long exposure deration is directly used to collect images, since the time taken to judge the quality of the first image is much less than the time difference between the long exposure time and the short exposure time, the unlocking time can be greatly reduced.

In a possible implementation manner, where the preprocessing the first image to acquire a value of a corresponding fingerprint parameter includes: preprocessing the first image to acquire the value of the corresponding fingerprint parameter in a case that it is determined that the first image is not a fingerprint pattern.

In this embodiment, once the processor determines that the first image is a fingerprint pattern, the processor can directly determine that the second image needs to be acquired without acquiring the value of the fingerprint parameter corresponding to the first image by preprocessing, thereby further reducing the unlocking time.

In a possible implementation manner, where the determining whether to acquire a second image collected by the fingerprint sensor at a second exposure time according to the first image includes: determining to acquire the second image in a case that it is determined that the first image is a fingerprint pattern.

In a possible implementation manner, where the performing fingerprint identification according to the first image and the second image in a case that it is determined to acquire the second image includes: determining whether an offset occurs between the second image and the first image in a case that it is determined to acquire the second image; and performing fingerprint identification in a case that it is determined that the offset occurs between the second image and the first image based on an image with higher quality between the first image and the second image.

In this embodiment, the determining whether the offset occurs between the second image and the first image refers to the determining whether the user' finger slides when the fingerprint sensor collects the first image and the second image, and in the case where the user's finger slides, an image with better quality can be selected from the first image and the second image for fingerprint identification.

In a possible implementation manner, where the determining whether an offset occurs between the second image and the first image in a case that it is determined to acquire the second image includes: calculating a standard deviation between a plurality pixel data of a preset position of the fingerprint sensor when collecting the first image and a plurality pixel data of the preset position of the fingerprint sensor when collecting the second image; and determining that an offset occurs between the second image and the first image in a case that it is determined that the standard deviation is greater than a second threshold.

In a possible implementation manner, the preset position is located in a center area of the fingerprint sensor.

In this embodiment, calculating the standard deviation between the pixel data of a plurality of pixels located in the central area in the first image and the second image is beneficial to improve the accuracy of the processor in determining whether an offset occurs between the second image and the first image, thus it is beneficial to obtain images with better quality and improve the success rate of user's unlocking.

In a possible implementation manner, where the determining whether an offset occurs between the second image and the first image in a case that it is determined to acquire the second image includes: determining an offset amount between a fingerprint texture of the first image and a fingerprint texture of the second image; and determining whether an offset occurs between the second image and the first image according to the offset amount.

In a possible implementation manner, where the performing fingerprint identification according to the first image and the second image in a case that it is determined to acquire the second image includes: performing fingerprint identification based on the second image in a case that it is determined to acquire the second image and the first image is a fingerprint pattern.

In a possible implementation manner, where the performing fingerprint identification according to the first image and the second image in a case that it is determined to acquire the second image includes: performing fusion on the first image and the second image in a case that it is determined to acquire the second image and the first image is not a fingerprint pattern; and performing fingerprint identification based on the first image and the second image after fusion.

In this embodiment, when the first image is a fingerprint pattern, the second image is more conducive to fingerprint identification; and in the case that the first image is not a fingerprint pattern, the first image and the second image are fused to facilitate fingerprint identification. Therefore, the technical solution provided by this embodiment is conducive to improving the success rate of the user's unlocking.

In a possible implementation manner, where the performing fusion on the first image and the second image includes: performing fusion on the first image and the second image in a case that it is determined that an offset does not occur between the second image and the first image.

In a possible implementation manner, where the performing fusion on the first image and the second image includes: performing fusion on an effective signal for fingerprint identification in the first image and an effective signal for fingerprint identification in the second image.

In this embodiment, the effective signal for fingerprint identification in the first image and the effective signal for fingerprint identification in the second image are fused to obtain a better quality image, which is beneficial to improve the success rate of the user's unlocking.

In a possible implementation where manner, the method further includes: adjusting dynamically the first threshold according to an unlocking rate of fingerprint identification using the first image.

In this embodiment, the first threshold for determining whether to acquire the second image is dynamically adjusted according to the unlocking rate of fingerprint identification using the first image, which can take into account the unlocking rate and the unlocking time, thereby maximizing the unlocking experience of the user.

In a possible implementation manner, where the adjusting dynamically the first threshold according to an unlocking rate of fingerprint identification using the first image includes: adjusting the first threshold downward by at least one level in a case that the unlocking rate is greater than a third threshold; or adjusting the first threshold upward by at least one level in a case that the unlocking rate is less than a fourth threshold, wherein the third threshold is greater than or equal to the fourth threshold.

In a possible implementation manner, where the third threshold is 85%, and the fourth threshold is 70%.

In a possible implementation manner, where the method further includes: determining whether an environment where the fingerprint sensor is located is a strong light environment according to the first image; and the determining whether to acquire a second image collected by the fingerprint sensor at a second exposure time according to the first image includes: determining whether to acquire a second image collected by the fingerprint sensor at a second exposure time according to the first image in a case that it is determined that the environment where the fingerprint sensor is located is not a strong light environment.

In a possible implementation manner, where the method further includes: acquiring a third image by the fingerprint sensor at a third exposure time in a case that it is determined that the environment where the fingerprint sensor is located is a strong light environment, where a length of the third exposure time is equal to a length of the first exposure time, and a gain of the fingerprint sensor when collecting the third image is less than a gain of the fingerprint sensor when collecting the first image; and performing fingerprint identification according to the third image.

In this embodiment, when it is judged based on the first image that the second image needs to be acquired, but the environment where the fingerprint sensor is located is also a strong light environment, the gain is preferentially reduced to re-collect the third image, which can improve the dynamic scope of image collection.

In a possible implementation manner, where the determining whether an environment where the fingerprint sensor is located is a strong light environment according to the first image includes: determining that the environment where the fingerprint sensor is located is a strong light environment in the case that a proportion of all pixel data of the fingerprint sensor that is greater than a fifth threshold exceeds a sixth threshold.

In a possible implementation manner, where the sixth threshold is 40%.

In a possible implementation manner, where the length of the second exposure time is twice the length of the first exposure time.

In a second aspect, an apparatus for fingerprint identification is provided, configured to execute the method in the first aspect and any of the possible implementation manners.

In a third aspect, an electronic device is provided, including: a fingerprint sensor, configured to collect a first image at a first exposure time and collect a second image at a second exposure time, where the second exposure time is continuous with the first exposure time, and a length of the second exposure time is greater than or equal to a length of the first exposure time; a processor, configured to: acquire the first image; determine whether to acquire the second image according to the first image; perform fingerprint identification according to the first image in a case that it is determined not to acquire the second image; or perform fingerprint identification according to the first image and the second image in a case that it is determined to acquire the second image.

DESCRIPTION OF EMBODIMENTS

The technical solutions in embodiments of the present application will be described hereinafter with reference to the accompanying drawings.

At present, fingerprint identification products are more and more favorable for people. Users have been paying more attention to the speed of fingerprint unlocking rate, and the users all hope to unlock as "fast" as possible. The shorter the unlocking time, the better the user experience.

Figure 1:
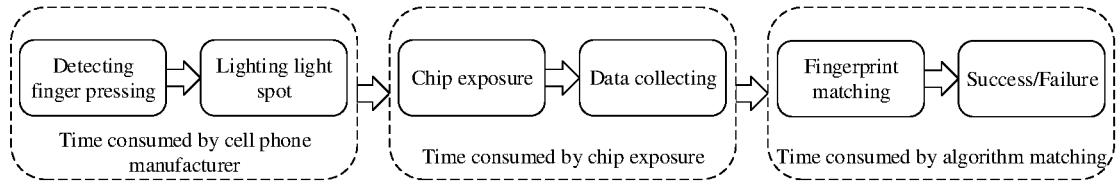
FIG. 1 is a schematic diagram of an optical fingerprint unlocking process according to an embodiment of the present application.

A complete unlocking process includes several steps as shown in FIG. 1: time consumed by cell phone manufacturers, time consumed by chip exposure, and time consumed by algorithm matching. Among them, the time consumed by cell phone manufacturers includes detecting finger pressing and lighting a light spot; the time consumed for chip exposure includes chip exposure and data collecting; and the time consumed for algorithm matching includes fingerprint matching and acquiring matching results (success/failure). The time consumed by cell phone manufacturers is mainly determined by the cell phone manufacturers, while the time consumed by chip exposure and algorithm matching are determined by chip system solutions and algorithm capabilities. No matter which part of the time-consuming is reduced, the user's unlocking experience can be improved.

Exposure duration of current fingerprint sensors is a fixed value, and in order to take into account the unlocking rate of the worst-quality finger, the fingerprint sensor is usually set with a long exposure duration, which leads to a long unlocking time and affects the user's experience.

Through big data statistics, the applicant found that good quality fingers accounted for about 80% of the fingers with an unlocking rate greater than 80%. In this regard, embodiments of the present application provide a method for fingerprint identification, which can take into account an unlocking rate and unlocking time, thereby improving unlocking experience of a user.

Figure 2:
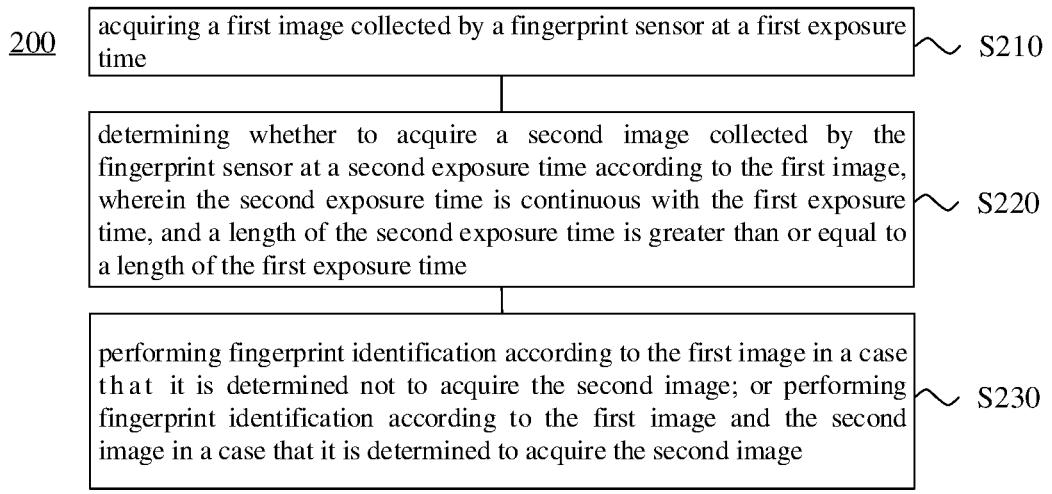
FIG. 2 is a schematic block diagram of a method for fingerprint identification according to an embodiment of the present application.

FIG. 2 is a schematic block diagram of the method 200 for fingerprint identification according to an embodiment of the present application. The method 200 shown in FIG. 2 can be executed by a processor, for example, by a main control processor of an electronic device or a microprocessor in a fingerprint identification apparatus (also referred to as fingerprint identification module, a fingerprint module, or fingerprint apparatus, etc.). That is, the apparatus for executing method 200 for fingerprint identification in the embodiments of the present application may be packaged with the fingerprint sensor, and the embodiments of the present application do not limit the execution body of the method 200. As shown in FIG. 2, the method 200 may include some or all of the following steps:

S210, acquiring a first image collected by a fingerprint sensor at a first exposure time.

S220, determining whether to acquire a second image collected by the fingerprint sensor at a second exposure time according to the first image, where the second exposure time is continuous with the first exposure time, and a length of the second exposure time is greater than or equal to a length of the first exposure time.

S230, performing fingerprint identification according to the first image in a case that it is determined not to acquire the second image; or performing fingerprint identification according to the first image and the second image in a case that it is determined to acquire the second image.

First of all, it should be explained that the first exposure time and the second exposure time in the embodiments of the present application refer to specific time periods, and the two time periods are continuous. For example, the first exposure time may be 9:00:00 AM-9:00:30 AM, and the second exposure time may be 9:00:30 AM-9:01:10 AM. The length of the first exposure time may be simply referred to as the first exposure duration, the length of the second exposure time may be simply referred to as the second exposure duration, and the second exposure duration is greater than or equal to the first exposure duration. That is to say, two consecutively exposed images may use one exposure duration; or two different exposure durations, and the latter exposure duration is greater than the former exposure duration.

It should also be noted that the length of the first exposure time in the embodiments of the present application is different from the long exposure duration mentioned in the prior art, and may refer to the shortest exposure duration used for unlocking a fingerprint image successfully.

For the fingerprint sensor, regardless of whether the processor acquires the second image, after the fingerprint sensor has collected the first image at the first exposure time, it will continue to collect the second image at the second exposure time.

It should be understood that, in this embodiments of the present application, the fingerprint sensor collects the first image at the first exposure time, which may be one frame of the first image, or a plurality of frames of the first image. Similarly, the fingerprint sensor collects the second image at the second exposure time, which may be one frame of the second image, or a plurality of frames of the second image. The number of frames of the first image and the second image is not limited in the embodiments of the present application.

For the processor, after the first image collected by the fingerprint sensor is acquired, that is, after the processor receives the first image transmitted by the fingerprint sensor, the processor may determine whether to obtain the second image collected by the fingerprint sensor based on the first image. For example, the processor may determine whether to acquire the second image based on the quality of the first image. When the processor determines that it is not necessary to acquire the second image, that is, the quality of the first image is acceptable and the probability of successful fingerprint identification is higher, the processor may perform fingerprint identification based on the first image. When the processor determines that it is necessary to acquire the second image, that is, the quality of the first image is worse and the probability of successful fingerprint identification is lower, then the processor needs to acquire the second image collected by the fingerprint sensor and perform fingerprint identification based on the first image and the second image.

Therefore, in the method for fingerprint identification in embodiments of the present application, the fingerprint sensor is configured for continuous exposure, and the processor may first determine, based on the first image collected at the first exposure time, whether to obtain the second image collected at the second exposure time. If it is determined not to acquire the second image collected at the second exposure time, fingerprint identification is performed directly based on the first image. If it is determined to acquire the second image collected at the second exposure time, identification is performed based on the first image and the second image. Since the fingerprint sensor supports continuous exposure, while the fingerprint sensor is collecting the second image, the processor is also acquiring and processing the first image. Compared with the technical solution that the fingerprint sensor acquires the second image in the case that the identification is unsuccessful based on the first image, this embodiment can reduce the unlocking time, thereby improving the user's unlocking experience.

In addition, the length of the second exposure time is configured to be greater than the length of the first exposure time, at this time, the length of the second exposure time may be referred to as the second exposure duration for short, and the length of the first exposure time may be referred to as the first exposure duration for short. In the case of fingerprint identification performed based on the first image, the unlocking time can be greatly reduced due to the relatively short first exposure time. And in the case of fingerprint identification performed based on the first image and the second image, since the fingerprint sensor is exposed continuously, that is, when the fingerprint sensor collects the second image, the processor also acquires and processes the first image, which can also reduce the unlocking time. Therefore, it is beneficial to reduce the unlocking time while taking into account the unlocking rate, so that the unlocking experience of the user can be improved.

Optionally, in an embodiment of the present application, an ending moment of the second exposure time is not early than a moment when the second image is acquired.

Firstly, it should be noted that the fingerprint sensor in the embodiments of the present application may be applicable for various exposure ways. Usually, in order to reduce the exposure time, a rolling shutter exposure method may be used. For example, a fingerprint sensor array includes M rows by N columns of pixels. Pixels in the same row in the pixel array are exposed at the same time, and after the pixels in this row are exposed for a certain period of time, the pixels in the next row are exposed at the same time. Next, the following rows of pixels are exposed sequentially. A time difference between the starting moments of exposure of two adjacent rows of pixels, for example, may generally be equal to the time it takes for the processor to read data of one row of pixels, so that the reading times of exposed data of different pixel rows do not overlap. Then, the data of M rows of pixels after exposed is processed, and a complete image is formed by splicing.

However, for a fingerprint sensor performing exposure row by row, the processor needs to obtain the data of each row of pixels after exposed in time, otherwise, the data of the next row of pixels after exposed will cover the data of the previous row of pixels after exposed. That is to say, in this embodiment of the present application, if the processor has not yet determined whether the second image needs to be acquired based on the first image, and the fingerprint sensor has completed the acquisition of the second image, then when the processor needs to acquire the second image, the data of the second image has been damaged. That is, a Cyclic Redundancy Check (CRC) error occurs. For example, the processor may only get the data for the last row of pixels after exposed in the fingerprint sensor. Therefore, the second exposure duration can be configured to be at least greater than the duration of the processor to receive the first image. Furthermore, the second exposure duration may be configured to be greater than the total duration of the processor to receive and process the first image.

In other embodiments, if a cache in the fingerprint sensor is large enough to store the data of the whole frame of images collected by the fingerprint sensor, then in this case, the second exposure duration can also be configured to be shorter than the total duration of the processor to receive and process the first image. That is, after the fingerprint sensor collects the second image, the data of the second image is stored inside the fingerprint sensor, and the fingerprint sensor can stop working and wait for the processor to read the data of the second image.

Although the whole text mostly takes the length of the second exposure time longer than the length of the first exposure time as an example to describe the embodiments of the present application, those skilled in the art understand that the embodiments of the present application are not limited thereto.

Optionally, in an embodiment of the present application, the determining whether to acquire a second image collected by the fingerprint sensor at a second exposure time according to the first image includes: preprocessing the first image to acquire a value of a corresponding fingerprint parameter, where the fingerprint parameter is configured to evaluate the quality of the image collected by the fingerprint sensor; and determining to acquire the second image in a case that it is determined that the value of the fingerprint parameter is less than a first threshold.

Further, the fingerprint parameter may include any one of the fingerprint signal, the fingerprint image quality score and the pixel data of the fingerprint sensor when collecting an image. Usually, the fingerprint signal is configured to indicate a difference in signal strength between a fingerprint ridge and a fingerprint valley. The fingerprint image quality score can be configured to quantify a fingerprint image. For example, the fingerprint image can be divided into a plurality of grades according to the quality, and different grades represent fingerprint images of different quality. In addition, since the fingerprint sensor usually includes a pixel array, each pixel in the pixel array of the fingerprint sensor has one pixel data, i.e., rawdata, when the fingerprint sensor collects an image. In an embodiment of the present application, it can be determined whether to acquire the second image based on any pixel data of the fingerprint sensor when collecting the first image; it can also be a data obtained by processing the pixel data (rawdata) of the fingerprint sensor when collecting the image, and based on the processed data, it is determined whether to acquire the second image. For example, all rawdata in the pixel array is averaged. For another example, a maximum value operation is performed on all rawdata in the pixel array. The embodiments of the present application are not limited thereto.

The preprocessing on the first image may include general fingerprint image preprocessing. For example, in the process of fingerprint collection, various noises are inevitably introduced, such as cross-connections and breakpoints in the image. These noises have a certain impact on the extraction of fingerprint feature information, and even generate many false feature points. Therefore, before extracting fingerprint features, it is necessary to filter the fingerprint image to remove useless information and enhance useful information. After the enhanced grayscale image is obtained, it needs to be further binarized to facilitate processing in subsequent processes. Fingerprint image preprocessing includes fingerprint region detection, image quality judgment, orientation map and frequency estimation, image enhancement, fingerprint image binarization and refinement, and the like.

The preprocessing to the first image may also include data processing on the fingerprint image. For example, an average operation is performed on all rawdata in the pixel array, or a maximum value operation is performed on all rawdata in the pixel array.

Different fingerprint parameters correspond to different first thresholds. For example, the fingerprint image quality score may be divided into 100 levels ranging from 1 to 100, and the first threshold may be 50, for example. That is, if the value of the fingerprint image quality score of the first image is greater than 50, it is determined not to acquire the second image, that is, fingerprint identification is performed based on the first image; if the value of the fingerprint image quality score of the first image is less than or equal to 50, then it is determined to acquire the second image, that is, fingerprint identification is performed based on the first image and the second image.

In this embodiment, preprocessing the first image is beneficial to the accuracy of fingerprint feature extraction. In addition, by comparing the value of the fingerprint parameter corresponding to the first image with the preset first threshold, the quality of the first image can be judged, that is to say, it can be judged whether the finger texture of the user currently pressed is clear. In the case that the quality of the first image is judged to be good, fingerprint identification can be performed directly based on the first image. Compared to the technical solutions of the prior art that a long exposure deration is directly used to collect images, since the time taken to judge the quality of the first image is much less than the time difference between the long exposure time and the short exposure time, the unlocking time can be greatly reduced.

Optionally, in an embodiment of the present application, the preprocessing the first image to acquire a value of a corresponding fingerprint parameter includes: preprocessing the first image to acquire the value of the corresponding fingerprint parameter in a case that it is determined that the first image is not a fingerprint pattern.

That is to say, before preprocessing the first image, the processor may first determine whether the first image is a fingerprint pattern, and then preprocess the first image if it is determined that the first image is not a fingerprint pattern. Usually in the under-screen optical fingerprint identification technology, the pressed position will be prompted on the display screen, that is to say, the fingerprint pattern will be displayed on the display screen to guide the user to perform fingerprint collection. The electronic device may pre-store the pattern of the fingerprint pattern. When the processor acquires the first image, it can match the pattern of the first image with the pattern of the fingerprint pattern pre-stored in the electronic device. If the matching is successful, it means that the first image is a fingerprint pattern; if the matching is unsuccessful, it means that the first image is not a fingerprint pattern.

Optionally, in an embodiment of the present application, the determining whether to acquire a second image collected by the fingerprint sensor at a second exposure time according to the first image includes: determining to acquire the second image in a case that it is determined that the first image is a fingerprint pattern.

In this embodiment, once the processor determines that the first image is a fingerprint pattern, the processor can directly determine that the second image needs to be acquired without acquiring the value of the fingerprint parameter corresponding to the first image by preprocessing, thereby further reducing the unlocking time.

Optionally, in an embodiment of the present application, the performing fingerprint identification according to the first image and the second image in a case that it is determined to acquire the second image includes: performing fingerprint identification based on the second image in a case that it is determined to acquire the second image and the first image is a fingerprint pattern.

Optionally, in an embodiment of the present application, the performing fingerprint identification according to the first image and the second image in a case that it is determined to acquire the second image includes: performing fusion on the first image and the second image in a case that it is determined to acquire the second image and the first image is not a fingerprint pattern; and performing fingerprint identification based on the first image and the second image of fusion.

In the case where the processor determines to acquire the second image based on the above-mentioned various embodiments, it may further determine whether the first image is a fingerprint pattern, and if the first image is a fingerprint pattern, the fingerprint identification is directly performed based on the second image. For example, if the processor determines to acquire the second image based on the value of the fingerprint parameter corresponding to the first image, the processor may further determine whether the first image is a fingerprint pattern, and finally, when it is determined that the first image is a fingerprint pattern, the processor performs fingerprint identification based on the second image; and when the processor determines that the first image is not a fingerprint pattern, the processor may perform fusion on the first image and the second image, and perform fingerprint identification based on the image after fusion. For another example, if the processor determines to acquire the second image based on the first image being a fingerprint pattern, the processor may directly perform fingerprint identification based on the second image.

In this embodiment, when the first image is a fingerprint pattern, the second image is more conducive to fingerprint identification; and in the case that the first image is not a fingerprint pattern, the fusion of the first image and the second image is more conducive to fingerprint identification. Therefore, the technical solution provided by this embodiment is conducive to improving the success rate of the user's unlocking.

Optionally, in an embodiment of the present application, the performing fingerprint identification according to the first image and the second image in a case that it is determined to acquire the second image includes: determining whether an offset occurs between the second image and the first image in a case that it is determined to acquire the second image; and performing fingerprint identification in a case that it is determined that the offset occurs between the second image and the first image based on an image with higher quality between the first image and the second image.

In this embodiment, the determining whether the offset occurs between the second image and the first image refers to the determining whether a finger of the user slides when the fingerprint sensor collects the first image and the second image, and in the case where the user's finger slides, an image with better quality can be selected from the first image and the second image for fingerprint identification.

As an example, the determining whether an offset occurs between the second image and the first image in a case that it is determined to acquire the second image includes: calculating a standard deviation between a plurality pixel data of a preset position of the fingerprint sensor when collecting the first image and a plurality pixel data of the preset position of the fingerprint sensor when collecting the second image; and determining that an offset occurs between the second image and the first image in a case that it is determined that the standard deviation is greater than a second threshold.

It should be understood that the first image may include pixel data acquired by each pixel in the pixel array of the fingerprint sensor, and the second image may include pixel data acquired by each pixel in the pixel array of the fingerprint sensor. The processor may specify a plurality of pixels of the fingerprint sensor in advance, that is, the positions of the plurality of pixels in the fingerprint sensor are fixed. After acquiring the first image and the second image, the processor may acquire pixel data on the specified plurality of pixels in the first image and pixel data on the specified plurality of pixels in the second image, respectively, then calculate the standard deviation between the two, and when the standard deviation is greater than a preset second threshold, it is determined that an offset occurs between the second image and the first image.

Optionally, the preset position is located in a center area of the fingerprint sensor. For example, the plurality of pixels in the preset position includes 50*50 pixels in the central area of the fingerprint sensor.

In this embodiment, calculating the standard deviation between the pixel data of a plurality of pixels located in the central area in the first image and the second image is beneficial to improve the accuracy of the processor in determining whether an offset occurs between the second image and the first image, thus it is beneficial to obtain images with better quality and improve the success rate of user's unlocking.

As another example, the determining whether an offset occurs between the second image and the first image in a case that it is determined to acquire the second image includes: determining an offset amount between a fingerprint texture of the first image and a fingerprint texture of the second image; and determining whether an offset occurs between the second image and the first image according to the offset amount.

Specifically, one of the first image and the second image can be fixed, and the other image can be moved to make the first image and the second image overlap, and the movement amount is the offset amount between the fingerprint texture of the first image and the fingerprint texture of the second image.

Optionally, the determining whether an offset occurs between the second image and the first image according to the offset amount between the fingerprint texture of the first image and the fingerprint texture of the second image may include: in the case of the offset amount greater than a certain threshold, it is determined that the offset occurs between the second image and the first image; in the case of the offset mount less than or equal to the certain threshold, it is determined that no offset occurs between the second image and the first image. For example, the certain threshold value is 0. That is to say, if the offset amount is equal to 0, it is determined that no offset occurs between the second image and the first image; if the offset is greater than 0, it is determined that the offset occurs between the second image and the first image.

Optionally, the fusion of first image and the second image described above may be performed in a case that it is determined that an offset does not occur between the second image and the first image. In other words, in the case that it is determined that an offset does not occur between the second image and the first image, the processor perform fusion on the first image and the second image.

Optionally, the fusion of first image and the second image described above may also be performed in a case that it is determined that an offset occurs between the second image and the first image. For example, if the offset occurs between the first image and the second image, the first image (the second image) may be fixed, and the second image (the first image) may be moved to make the first image and the second image overlap, and the second image (first image) and the first image (second image) after moved may be fused.

Optionally, in an embodiment of the present application, the performing fusion on the first image and the second image includes: performing fusion on an effective signal for fingerprint identification in the first image and an effective signal for fingerprint identification in the second image.

That is to say, before the first image and the second image are fused, the effective signal in the first image and the effective signal in the second image need to be extracted first. The effective signal of the first image can be used for fingerprint identification alone, and the effective signal of the second image can also be used for fingerprint identification alone, and the effective signal can be a signal received by the fingerprint sensor with noise removed.

In this embodiment, the effective signal for fingerprint identification in the first image and the effective signal for fingerprint identification in the second image are fused to obtain a better quality image, thereby improving the success rate of the user's unlocking.

In other embodiments, the first image and the second image may not be processed, and the first image and the second image may be directly fused. For example, the pixel data of the first image may be directly added to the pixel data of the second image to obtain the fused image.

In another embodiment of the present application, in the case where it is determined that the first image is not a fingerprint pattern, the processor may also not perform fusion on the first image and the second image, but directly select the image with better quality from the first image and the second image for fingerprint identification.

Optionally, in an embodiment of the present application, the method 200 further includes: adjusting dynamically the first threshold according to the unlocking rate of fingerprint identification using the first image.

When the fingerprint identification reaches stability after a certain period of use, the first threshold may be adjusted. Taking the first threshold as the first threshold corresponding to the fingerprint image quality score as an example, assuming that the first threshold is 26, at this time, the unlocking rate of using the first image for fingerprint identification is higher than 90%, but the proportion of using the first image in embodiments of the present application for fingerprint identification is less than 50%. Therefore, the first threshold may be adjusted dynamically according to an unlocking rate of fingerprint identification using the first image.

In this embodiment, the first threshold for determining whether to acquire the second image is dynamically adjusted according to the unlocking rate of fingerprint identification using the first image, which can take into account the unlocking rate and the unlocking time, thereby maximizing the unlocking experience of the user.

In an example, the adjusting dynamically the first threshold according to an unlocking rate of fingerprint identification using the first image includes: adjusting the first threshold downward by at least one level when the unlocking rate is greater than a third threshold; or adjusting the first threshold upward by at least one level when the unlocking rate is less than a fourth threshold, where the third threshold is greater than or equal to the fourth threshold.

Optionally, the third threshold is 85%, and the fourth threshold is 70%.

Taking the fingerprint parameter being the fingerprint image quality score as an example, assuming that the first threshold A is 26, the unlocking rate of using the first image for fingerprint identification for many consecutive times (for example, 100 times) is calculated as P1; if P1 is greater than 85%, then A=A−1; if P1 is less than 70%, then A=A+1.

It should be noted that the processor may also adjust the first threshold A downward by several levels when the unlocking rate is particularly high. However, when the unlocking rate is particularly low, the first threshold A is adjusted upward by several levels. For example, if P1 is greater than 95%, then A=A−3; if P1 is less than 50%, then A=A+5.

Usually, the first threshold has an upper limit and a lower limit, that is, the adjustment range of the first threshold should be between the upper limit and the lower limit. For example, 15<first threshold A<28, that is, the upper limit of the first threshold A is 28, and the lower limit is 15. When the first threshold A is adjusted downward to the lower limit of 15, the first threshold A is directly set to 15; when the first threshold A is adjusted upward to the upper limit of 28, the first threshold A is directly set to 28.

Optionally, in an embodiment of the present application, the method further includes: determining whether an environment where the fingerprint sensor is located is a strong light environment according to the first image; and the determining whether to acquire a second image collected by the fingerprint sensor at a second exposure time according to the first image includes: determining whether to acquire a second image collected by the fingerprint sensor at a second exposure time according to the first image in a case that it is determined that the environment where the fingerprint sensor is located is not a strong light environment.

Optionally, in an embodiment of the present application, the method further includes: acquiring a third image by the fingerprint sensor at a third exposure time in a case that it is determined that the environment where the fingerprint sensor is located is a strong light environment, where a length of the third exposure time is equal to a length of the first exposure time, and a gain of the fingerprint sensor when collecting the third image is less than a gain of the fingerprint sensor when collecting the first image; and performing fingerprint identification according to the third image.

That is, before the processor determines whether to acquire the second image according to the first image, the processor may first determine whether the environment where the fingerprint sensor is located is a strong light environment based on the first image. In a strong light environment, the first image acquired by the fingerprint sensor may be overexposed, resulting in poor fingerprint information of the first image. Therefore, the fingerprint sensor needs to acquire an image again. But at the same time, the poor fingerprint information of the first image may only be caused by the environment where the fingerprint sensor is located in a strong light environment. Therefore, the fingerprint sensor can again collect the third image with a short exposure (that is, the first exposure duration) and a reduced gain, and the processor can perform fingerprint identification based on the third image. At this time, the processor may control the fingerprint sensor to collect the third image during the process of collecting the second image by the fingerprint sensor. That is to say, once the processor determines that the environment where the fingerprint sensor is located is a strong light environment, the processor can directly issue an instruction to the fingerprint sensor to configure the exposure duration of the fingerprint sensor to the first exposure duration again, and configure the gain of the fingerprint sensor to be lower than the gain when the first image is collected, and collect the third image in this configuration.

Optionally, in an embodiment of the present application, the determining whether an environment where the fingerprint sensor is located is a strong light environment according to the first image includes: determining that the environment where the fingerprint sensor is located is a strong light environment in the case that a proportion of all pixel data of the fingerprint sensor that is greater than a fifth threshold exceeds a sixth threshold.

Specifically, if the proportion of the pixel data of the entire frame of pixels in the first image is greater than the strong light threshold (i.e., the fifth threshold) exceeds 40%, the processor may determine that the environment where the fingerprint sensor is located is a strong light environment.

In this embodiment, when it is judged based on the first image that the second image needs to be acquired, but the environment where the fingerprint sensor is located is also a strong light environment, the gain is preferentially reduced to re-collect the third image, which can improve the dynamic scope of image collection.

Optionally, in an embodiment of the present application, the length of the second exposure time is twice the length of the first exposure time.

Figure 3:
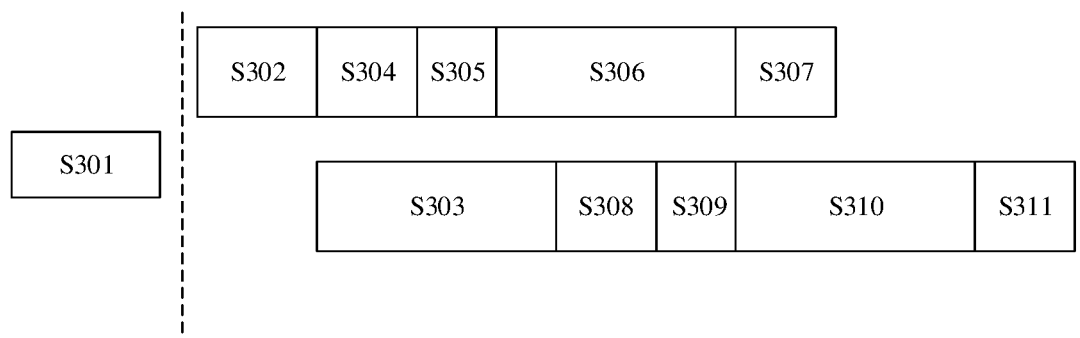
FIG. 3 is a schematic flowchart of a method for fingerprint identification based on smart exposure according to an embodiment of the present application.

FIG. 3 shows a sequence diagram of a method for realizing fingerprint identification based on adaptive exposure provided by an embodiment of the present application. Specifically, the processor presets an exposure configuration, which includes two different exposure durations, and the fingerprint sensor supports continuous exposure. The fingerprint sensor preferentially acquires a frame of image under a short exposure duration, and the processor preprocesses the frame of image and judges the state of the finger. When the quality of the finger is good, the frame image is used for fingerprint identification. At this time, the time-consuming is shorter; when the quality of the finger is poor, then the processor continues to acquire the frame of the image from the fingerprint sensor at a long exposure duration; then perform fusion on the two frame images, and the processor performs fingerprint identification based on the images after fusion to further improve the unlocking rate.

As shown in FIG. 3, the method includes:
S301, the fingerprint sensor downloads the exposure configuration in advance;
S302, the fingerprint sensor starts continuous exposure, and collects the first frame of image at a short exposure duration, and the short exposure duration is 22 ms;
S303, after the fingerprint sensor has collected the first frame of image, immediately collects the second frame of image at the long exposure duration, and the long exposure duration is 44 ms;
S304, after the fingerprint sensor has collected the first frame of image, immediately sends the first frame of image to the processor, that is, the processor immediately receives the first frame of image sent by the fingerprint sensor, and this step takes about 18 ms;
S305, after the processor has received the first frame of image, may preprocess the first frame of image, and judge the quality of the finger, and this step takes about 6 ms;
S306, when it is judged that the quality of the finger is good, fingerprint identification is performed based on the first frame of image, and this step takes about 43 ms;
S307, acquiring the identification result in step S306;
S308, when it is judged that the quality of the finger is poor, the processor can control the fingerprint sensor to transmit the second frame of image to it, and this step takes about 18 ms;
S309, the processor may perform fusion preprocessing on the first frame of image and the second frame of image to acquire the fused frame image, and this step takes about 6 ms;
S310, the processor performs fingerprint identification based on the fused frame acquired in step S309, and this step takes about 43 ms;
S311, the identification result in step S310 is acquired.

It should be noted that in the whole process, the total time consumed by the fingerprint sensor to transmit images and the processor to perform preprocessing and finger judgment is less than the long exposure duration to prevent CRC.

Optionally, in this embodiment of the present application, the fingerprint sensor may be configured in a multi-frame continuous exposure mode, and the processor may use the technical solution provided by the embodiment of the present application to determine whether to acquire the next frame of image when the processor acquires each frame of image. For example, the exposure duration of the first frame of the fingerprint sensor is t1, the exposure duration of the second frame is t2, and the exposure duration of the third frame is t3, etc., where t1 may be less than or equal to t2, t2 may be less than or equal to t3, and so on. Further, the exposure duration of each frame can also be set to be greater than or equal to the total duration of reading, preprocessing and finger judgment of the previous frame of image.

The fingerprint identification method according to the embodiments of the present application is described in detail above. The fingerprint identification apparatus according to the embodiments of the present application will be described below with reference to FIG. 4. The technical features described in the method embodiments are applicable to the following apparatus embodiments.

Figure 4:
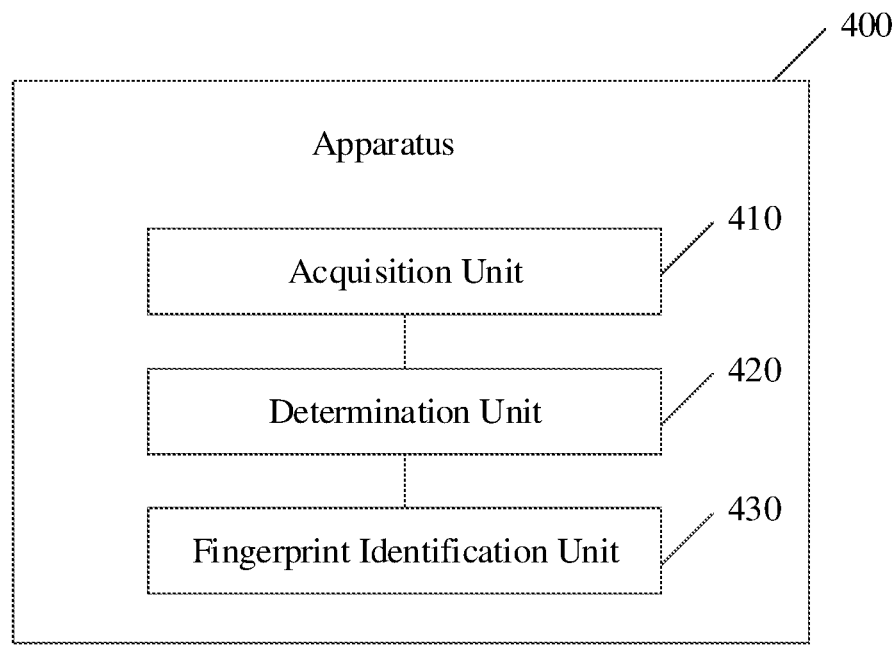
FIG. 4 is a schematic block diagram of an apparatus for fingerprint identification according to an embodiment of the present application.

FIG. 4 illustrates a schematic block diagram of an apparatus 400 for the fingerprint identification of an embodiment of the present application. As shown in FIG. 4, the apparatus 400 includes:
acquisition unit 410, configured to acquire a first image collected by a fingerprint sensor at a first exposure time.
determination unit 420, configured to determine whether to acquire a second image collected by the fingerprint sensor at a second exposure time according to the first image, where the second exposure time is continuous with the first exposure time, and a length of the second exposure time is greater than or equal to a length of the first exposure time;
fingerprint identification unit 430, configured to perform fingerprint identification according to the first image in a case that it is determined not to acquire the second image; or perform fingerprint identification according to the first image and the second image in a case that it is determined to acquire the second image.

Optionally, in an embodiment of the present application, an ending moment of the second exposure time is not early than a moment when the second image is acquired.

Optionally, in an embodiment of the present application, the determination unit 420 is specifically configured to: preprocess the first image to acquire a value of a corresponding fingerprint parameter, where the fingerprint parameter includes any one of a fingerprint signal, a fingerprint image quality score, and pixel data of the fingerprint sensor when collecting an image; and determine to acquire the second image in a case that it is determined that the value of the fingerprint parameter is less than a first threshold.

Optionally, in an embodiment of the present application, the determination unit 420 is specifically configured to: preprocess the first image to acquire the value of the corresponding fingerprint parameter in a case that it is determined that the first image is not a fingerprint pattern.

Optionally, in an embodiment of the present application, the determination unit 420 is specifically configured to: determine to acquire the second image in a case that it is determined that the first image is a fingerprint pattern.

Optionally, in an embodiment of the present application, the determination unit 420 is further configured to: determine whether an offset occurs between the second image and the first image in a case that it is determined to acquire the second image; and the fingerprint identification unit 530 is specifically configured to: perform fingerprint identification in a case that it is determined that the offset occurs between the second image and the first image based on an image with higher quality between the first image and the second image.

Optionally, in an embodiment of the present application, the determination unit 420 is specifically configured to: calculate a standard deviation between a plurality pixel data of a preset position of the fingerprint sensor when collecting the first image and a plurality pixel data of the preset position of the fingerprint sensor when collecting the second image; and determine that an offset occurs between the second image and the first image in a case that it is determined that the standard deviation is greater than a second threshold.

Optionally, in an embodiment of the present application, the preset position is located in a center area of the fingerprint sensor.

Optionally, in an embodiment of the present application, the determination unit 420 is specifically configured to: determine an offset amount between a fingerprint texture of the first image and a fingerprint texture of the second image; and determine whether an offset occurs between the second image and the first image according to the offset amount.

Optionally, in an embodiment of the present application, the determination unit 420 is specifically configured to: perform fingerprint identification based on the second image in a case that it is determined to acquire the second image and the first image is a fingerprint pattern.

Figure 5:
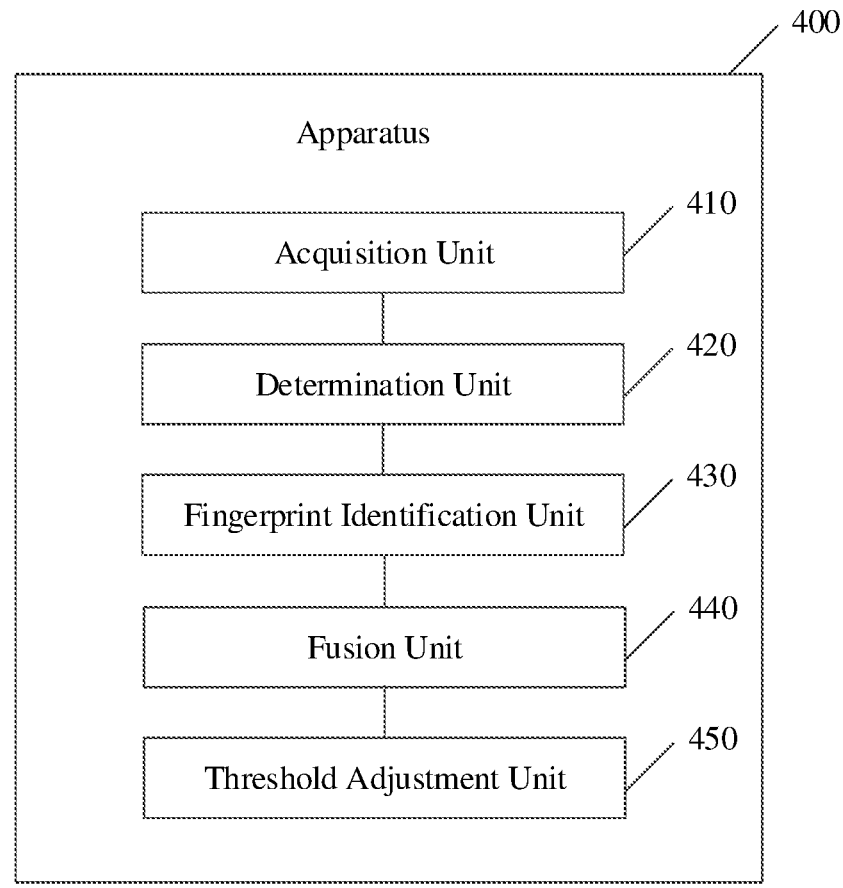
FIG. 5 is a schematic block diagram of another apparatus for fingerprint identification according to an embodiment of the present application.

Optionally, as shown in FIG. 5, the apparatus 400 further includes: a fusion unit 440, configured to perform fusion on the first image and the second image in a case that it is determined to acquire the second image and the first image is not a fingerprint pattern; and the fingerprint identification unit 430 is specifically configured to: perform fingerprint identification based on the first image and the second image after fusion.

Optionally, in an embodiment of the present application, the fusion unit 440 is specifically configured to: perform fusion on the first image and the second image in a case that it is determined that an offset does not occur between the second image and the first image.

Optionally, in an embodiment of the present application, the fusion unit 440 is specifically configured to: perform fusion on an effective signal for fingerprint identification in the first image and an effective signal for fingerprint identification in the second image.

Optionally, as shown in FIG. 5, the apparatus 400 further includes: a threshold adjustment unit 450, configured to adjust dynamically the first threshold according to an unlocking rate of fingerprint identification using the first image.

Optionally, in an embodiment of the present application, threshold adjustment unit 450 is specifically configured to adjust the first threshold downward by at least one level in a case that the unlocking rate is greater than a third threshold; or adjust the first threshold upward by at least one level in a case that the unlocking rate is less than a fourth threshold, where the third threshold is greater than or equal to the fourth threshold.

Optionally, in an embodiment of the present application, the third threshold is 85%, and the fourth threshold is 70%.

Optionally, in an embodiment of the present application, the determination unit 420 is configured to: determine whether an environment where the fingerprint sensor is located is a strong light environment according to the first image; and the determination unit 420 is specifically configured to: determine whether to acquire a second image collected by the fingerprint sensor at a second exposure time according to the first image in a case that it is determined that the environment where the fingerprint sensor is located is not a strong light environment.

Optionally, in an embodiment of the present application, the determination unit 410 is configured to: acquire a third image by the fingerprint sensor at a third exposure time in a case that it is determined that the environment where the fingerprint sensor is located is a strong light environment, where a length of the third exposure time is equal to a length of the first exposure time, and a gain of the fingerprint sensor when collecting the third image is less than a gain of the fingerprint sensor when collecting the first image; and the fingerprint identification unit 430 is further configured to: perform fingerprint identification according to the third image.

Optionally, in an embodiment of the present application, the determination unit 420 is specifically configured to: determine that the environment where the fingerprint sensor is located is a strong light environment in the case that a proportion of all pixel data of the fingerprint sensor that is greater than a fifth threshold exceeds a sixth threshold.

Optionally, in an embodiment of the present application, the sixth threshold is 40%.

Optionally, in an embodiment of the present application, the length of the second exposure time is twice the length of the first exposure time.

Figure 6:
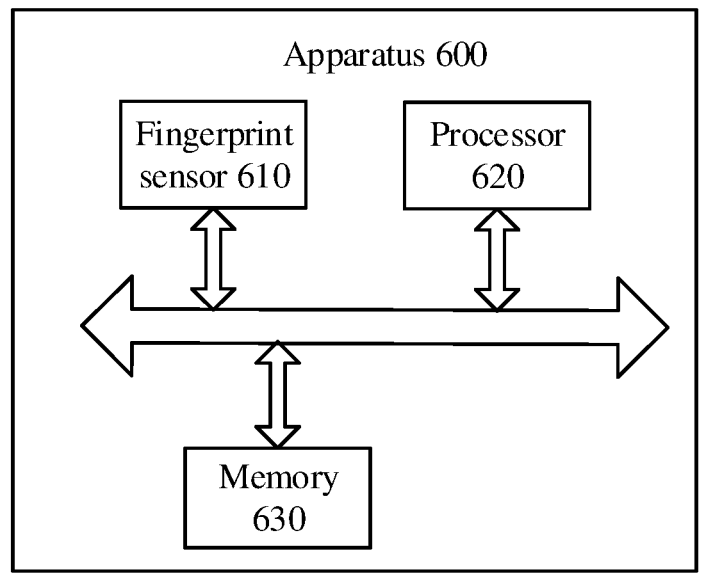
FIG. 6 is a schematic structural diagram of an electronic device according to an embodiment of the present application.

FIG. 6 shows a schematic block diagram of the electronic device 600 according to an embodiment of the present application. As shown in FIG. 6, the electronic device 600 includes: a fingerprint sensor 610, configured to collect a first image at a first exposure time and collect a second image at a second exposure time, where the second exposure time is continuous with the first exposure time, and a length of the second exposure time is greater than or equal to a length of the first exposure time. The electronic device 500 may further include a processor 620, the processor 620 may call a computer program from a memory and run it to implement the method in the embodiment of the present application.

Optionally, as shown in FIG. 6, the electronic device 600 may further include a memory 630. The processor 620 may call a computer program from the memory 630 and run it to implement the method in the embodiment of the present application.

The memory 630 may be a separate device independent of the processor 610 or may be integrated in the processor 610.

Figure 7:
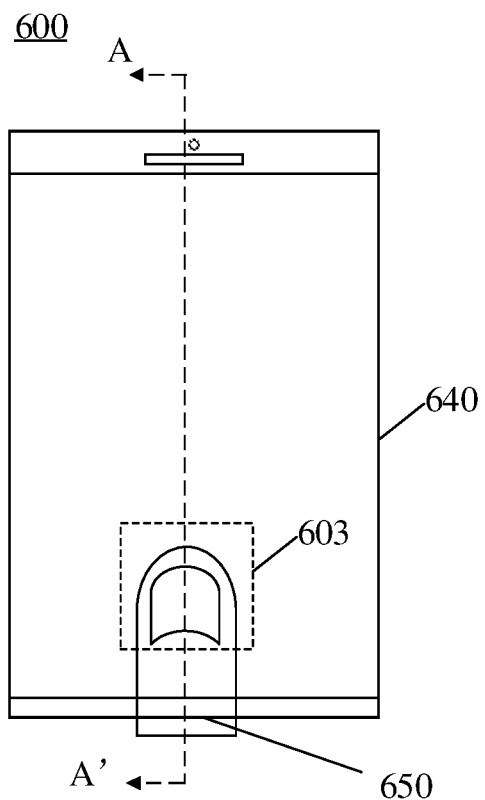
FIG. 7 is another schematic structural diagram of the electronic device according to an embodiment of the present application.
Figure 8:
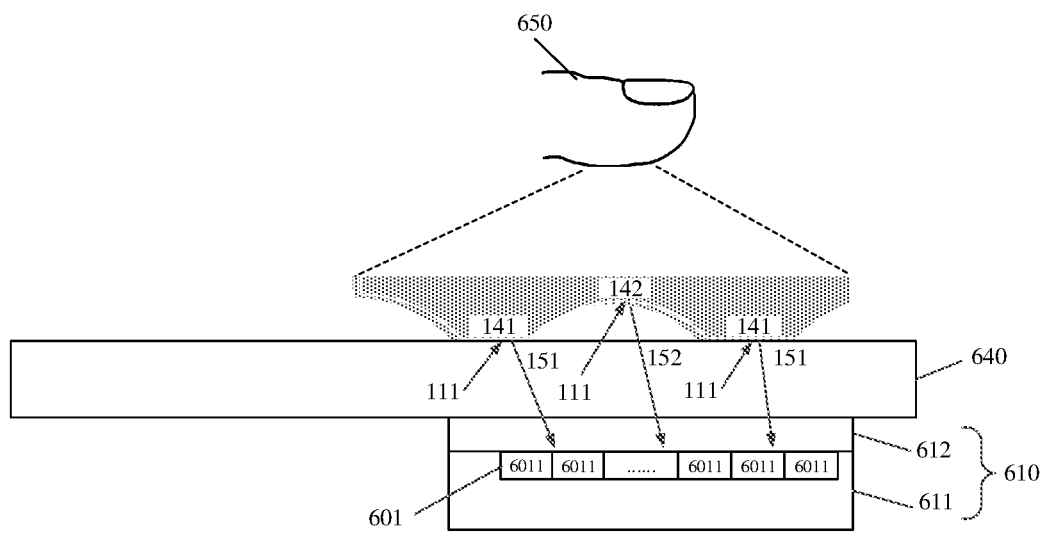
FIG. 8 is yet another schematic structural diagram of the electronic device according to an embodiment of the present application.

FIG. 7 and FIG. 8 show a schematic structure diagram of the electronic device 600 according to an embodiment of the present application. Among them, FIG. 7 is a front schematic diagram of the electronic device 600, and FIG. 8 is a schematic structure diagram of the electronic device 600 shown in FIG. 7 along A-A'. The electronic device 600 includes a display screen 640 and a fingerprint sensor 610 disposed below the display screen 640. The electronic device also includes a processor 620 shown in FIG. 6, the processor 620 can be packaged with the fingerprint sensor 610, or the processor 620 is independent of the fingerprint sensor chip 610, for example, the processor 620 is the main control processor of the electronic device 600.

As shown in FIG. 8, the fingerprint sensor 610 includes a light detection portion 611 and an optical path guiding structure 612. The light path guiding structure 612 is provided above the light detection portion 611. The light detection portion 611 includes a pixel array 601 composed of a plurality of pixels 6011, a control circuit 602 connected to the pixel array 601, and the like. Among them, as shown in FIG. 8, the region where the pixel array 601 is located or its sensing region is a fingerprint detection region 603 of the fingerprint sensor 610. The optical path guiding structure 612 is configured to guide the light signal returned from the finger on the fingerprint detection area 603 to the pixel array 601.

The optical path guiding structure 612 in the fingerprint sensor 610 is not limited in the embodiments of the present application. For example, the optical path guiding structure 612 may include a microlens array composed of a plurality of microlenses. Further, at least one light-blocking layer may be provided below the microlens array, where each light-blocking layer is provided with a plurality of openings corresponding to the plurality of microlenses, and the pixel array 601 includes a plurality of pixels 6011 corresponding to the microlens. Each microlens is configured to condense the light signal returned from the finger to the corresponding opening in each light-blocking layer, so that the light signal passes through the corresponding opening in each light-blocking layer in turn and is transmitted to the corresponding pixel 6011 in the pixel array 601.

For another example, the optical path guiding structure 612 may include a collimator layer fabricated on a semiconductor silicon wafer, which has a plurality of collimation units or an array of micro holes, and the collimation units may be small holes.

For another example, the optical path guiding structure 612 may include an optical lens layer having one or more lens units, where the lens unit may be a lens group consisting of one or more aspherical lenses. For example, as shown in FIG. 8, the optical path guiding structure may include a lens 6121. The light emitted by the light emitting layer 1401 in the display screen irradiates the finger and the light returned from the finger can be condensed to the pixel array 601 of the optical fingerprint sensor through the lens 6121.

During the fingerprint detection, the display screen 140 emits a beam of light 111 to the finger 650 above the fingerprint detection region 603, and the light 111 is reflected by a surface of the finger 650 to form reflected light or form scattered light after scattering inside the finger 650. Since ridges and valleys of a finger have different reflectivity, the reflected light 151 from the ridge of the fingerprint and the reflected light 152 from the valley of the fingerprint have different light intensity. After passing through the optical path guiding structure 612, the reflected light is received by the pixel array 601 and converted to a corresponding electrical signal, that is, a fingerprint detection signal. Based on the fingerprint detection signal, the fingerprint image data can be obtained and further configured for fingerprint matching and verification, thus implementing the function of optical fingerprint detection in the electronic device 600.

Further, the electronic device 600 may further include an excitation light source for fingerprint detection.

Among them, the display screen 640 may adopt a display screen with a self-emitting display unit, such as an organic light-emitting diode (OLED) display screen or a micro light-emitting diode (Micro-LED) display screen. Taking the OLED display screen as an example, the fingerprint sensor 610 may use the display unit of the OLED display screen 640 located in the fingerprint detection region 603 as an exciting light source for optical fingerprint detection.

By way of example and not limitation, the electronic device in the embodiment of the present application may be portable or mobile computing devices such as a terminal device, a mobile phone, a tablet computer, a notebook computer, a desktop computer, a gaming device, an in-vehicle electronic device or a wearable smart device, and other electronic devices such as an electronic database, an automobile and an automated teller machine (ATM). The wearable smart device includes a device that is full-featured and large-sized and may realize complete or partial functions without relying on a smart phone, such as a smart watch or smart glasses, and a device that only focuses on a certain type of application function, and shall be used in cooperation with other device such as a smart phone, for example, various types of smart bracelets, smart jewelry and other devices for physical sign monitoring.

Embodiments of the present application further provide a chip, the chip includes a processor that can invoke a computer program from a memory and run it to implement the method in the embodiments of the present application.

Optionally, the chip can be applied to the apparatus for collecting fingerprint images in the embodiments of the present application, and the chip can implement the corresponding processes implemented by the apparatus for collecting fingerprint images in various methods of the embodiments of the present application. For brevity, details are not described again here.

It should be understood that the chip mentioned in the embodiments of the present application may also be referred to as system level chip, system chip, chip system, or system-on-chip, or the like.

Optionally, the embodiments of the present application further provide a computer-readable medium, which is used to store a computer program for implementing the methods in the embodiments of the present application.

Those of ordinary skill in the art may be aware that, units and algorithm steps of the examples described in the embodiments disclosed herein may be implemented by electronic hardware, or a combination of computer software and electronic software. Whether these functions are performed by hardware or software depends on particular applications and designed constraint conditions of the technical solutions. Those skilled may implement the described functions by using different methods for each specific application, but this implementation should not be considered to be beyond the scope of the present disclosure.

Those skilled in the art may clearly understand that, for convenience and simplicity of description, the specific working processes of the system, the apparatus and the units described above may refer to corresponding processes in the foregoing method embodiments, and will not be repeated redundantly herein.

In the several embodiments provided in the present application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or other forms.

The units described as separate parts may or may not be physically separate, and parts displayed as units may or may not be physical units, and may be located in one position, or may be distributed on a plurality of network units. Some or all of the units may be selected based on actual requirements, to achieve the objectives of the solutions of the embodiments.

In addition, functional units in each embodiment of the present application may be integrated into one processing unit, or each of the units may exist alone physically, or two or more units are integrated into one unit.

When the functions are implemented in the form of a software function unit and sold or used as an independent product, the functions may be stored in a computer readable storage medium. Based on such an understanding, the technical solutions of this application essentially, or the part contributing to the prior art, or some or all of the technical solutions may be implemented in the form of a software product. The computer software product is stored in a storage medium and includes several instructions for instructing a computer device (which may be a personal computer, a server, a network device, or the like) to perform some or all of the steps of the methods described in the embodiments of this application. The preceding storage mediums includes various mediums that can store program codes, such as, a U disk, a removable hard disk, a read-only memory (ROM), a random access memory (RAM), a magnetic disk, an optical disk, or the like.

The foregoing descriptions are merely specific implementation manners of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A method for fingerprint identification, comprising:
   acquiring a first image collected by a fingerprint sensor at a first exposure time;
   determining whether to acquire a second image collected by the fingerprint sensor at a second exposure time according to the first image, wherein the second exposure time is continuous with the first exposure time, and a length of the second exposure time is greater than or equal to a length of the first exposure time;
   performing fingerprint identification according to the first image in a case that it is determined not to acquire the second image; or performing fingerprint identification according to the first image and the second image in a case that it is determined to acquire the second image;
   wherein the determining whether to acquire a second image collected by the fingerprint sensor at a second exposure time according to the first image comprises:
   preprocessing the first image to acquire a value of a corresponding fingerprint parameter, wherein the fingerprint parameter comprises any one of a fingerprint signal, a fingerprint image quality score, and pixel data of the fingerprint sensor when collecting an image; and
   determining to acquire the second image in a case that it is determined that the value of the fingerprint parameter is less than a first threshold;
   wherein the preprocessing the first image to acquire a value of a corresponding fingerprint parameter comprises:
   preprocessing the first image to acquire the value of the corresponding fingerprint parameter in a case that it is determined that the first image is not a fingerprint pattern.

2. The method according to claim 1, wherein an ending moment of the second exposure time is not earlier than a moment when the second image is acquired.

3. The method according to claim 1, wherein the performing fingerprint identification according to the first image and the second image in a case that it is determined to acquire the second image comprises:
   determining whether an offset occurs between the second image and the first image in a case that it is determined to acquire the second image; and
   performing fingerprint identification in a case that it is determined that the offset occurs between the second image and the first image based on an image with higher quality between the first image and the second image.

4. The method according to claim 3, wherein the determining whether an offset occurs between the second image and the first image in a case that it is determined to acquire the second image comprises:
   calculating a standard deviation between a plurality pixel data of a preset position of the fingerprint sensor when collecting the first image and a plurality pixel data of the preset position of the fingerprint sensor when collecting the second image; and
   determining that an offset occurs between the second image and the first image in a case that it is determined that the standard deviation is greater than a second threshold.

5. The method according to claim 4, wherein the preset position is located in a center area of the fingerprint sensor.

6. The method according to claim 3, wherein the determining whether an offset occurs between the second image and the first image in a case that it is determined to acquire the second image comprises:
   determining an offset amount between a fingerprint texture of the first image and a fingerprint texture of the second image; and
   determining whether an offset occurs between the second image and the first image according to the offset amount.

7. The method according to claim 1, wherein the performing fingerprint identification according to the first image and the second image in a case that it is determined to acquire the second image comprises:
   performing fingerprint identification based on the second image in a case that it is determined to acquire the second image and the first image is a fingerprint pattern; or
   performing fusion on the first image and the second image in a case that it is determined to acquire the second image and the first image is not a fingerprint pattern; and
   performing fingerprint identification based on the first image and the second image after fusion.

8. The method according to claim 7, wherein the performing fusion on the first image and the second image comprises:
   performing fusion on an effective signal for fingerprint identification in the first image and an effective signal for fingerprint identification in the second image in a case that it is determined that an offset does not occur between the second image and the first image.

9. The method according to claim 1, wherein the method further comprises:
   adjusting dynamically the first threshold according to an unlocking rate of fingerprint identification using the first image.

10. The method according to claim 9, wherein the adjusting dynamically the first threshold according to an unlocking rate of fingerprint identification using the first image comprises:

adjusting the first threshold downward by at least one level in a case that the unlocking rate is greater than a third threshold; or adjusting the first threshold upward by at least one level in a case that the unlocking rate is less than a fourth threshold, wherein the third threshold is greater than or equal to the fourth threshold; and wherein the third threshold is 85%, and the fourth threshold is 70%.

11. The method according to claim 1, wherein the method further comprises:

determining whether an environment where the fingerprint sensor is located is a strong light environment according to the first image; and the determining whether to acquire a second image collected by the fingerprint sensor at a second exposure time according to the first image comprises:

determining whether to acquire a second image collected by the fingerprint sensor at a second exposure time according to the first image in a case that it is determined that the environment where the fingerprint sensor is located is not a strong light environment; and wherein the method further comprises:

acquiring a third image by the fingerprint sensor at a third exposure time in a case that it is determined that the environment where the fingerprint sensor is located is a strong light environment, wherein a length of the third exposure time is equal to a length of the first exposure time, and a gain of the fingerprint sensor when collecting the third image is less than a gain of the fingerprint sensor when collecting the first image; and performing fingerprint identification according to the third image.

12. The method according to claim 11, wherein the determining whether an environment where the fingerprint sensor is located is a strong light environment according to the first image comprises:

determining that the environment where the fingerprint sensor is located is a strong light environment in the case that a proportion of all pixel data of the fingerprint sensor that is greater than a fifth threshold exceeds a sixth threshold; and wherein the sixth threshold is 40%.

13. The method according to claim 1, wherein the length of the second exposure time is twice the length of the first exposure time.

14. An electronic device, comprising:

a fingerprint sensor, configured to collect a first image at a first exposure time and collect a second image at a second exposure time, wherein the second exposure time is continuous with the first exposure time, and a length of the second exposure time is greater than or equal to a length of the first exposure time;

a processor, configured to:

acquire the first image;

determine whether to acquire the second image according to the first image;

perform fingerprint identification according to the first image in a case that it is determined not to acquire the second image; or perform fingerprint identification according to the first image and the second image in a case that it is determined to acquire the second image;

wherein the determining whether to acquire a second image collected by the fingerprint sensor at a second exposure time according to the first image comprises:

preprocessing the first image to acquire a value of a corresponding fingerprint parameter, wherein the fingerprint parameter comprises any one of a fingerprint signal, a fingerprint image quality score, and pixel data of the fingerprint sensor when collecting an image; and determining to acquire the second image in a case that it is determined that the value of the fingerprint parameter is less than a first threshold;

wherein the preprocessing the first image to acquire a value of a corresponding fingerprint parameter comprises:

preprocessing the first image to acquire the value of the corresponding fingerprint parameter in a case that it is determined that the first image is not a fingerprint pattern.

15. The electronic device according to claim 14, wherein an ending moment of the second exposure time is not earlier than a moment when the second image is acquired.

16. The electronic device according to claim 14, wherein the processor is configured to:

determine whether an offset occurs between the second image and the first image in a case that it is determined to acquire the second image; and perform fingerprint identification in a case that it is determined that the offset occurs between the second image and the first image based on an image with higher quality between the first image and the second image.

* * * * *